United States Patent
Bichot et al.

(10) Patent No.: US 9,918,112 B2
(45) Date of Patent: Mar. 13, 2018

(54) SYSTEM AND METHOD FOR MULTIPLEXED STREAMING OF MULTIMEDIA CONTENT

(71) Applicant: THOMSON LICENSING, Issy de Moulineaux (FR)

(72) Inventors: Guillaume Bichot, Cesson Sevigne (FR); Yvon Legallais, Rennes (FR); Stephane Gouache, Cesson Sevigne (FR)

(73) Assignee: Thomson Licensing, Issy-les-Moulineaux (FR)

( * ) Notice: Subject to any disclaimer, the term of this patent is extended or adjusted under 35 U.S.C. 154(b) by 184 days.

(21) Appl. No.: 14/368,837

(22) PCT Filed: Dec. 20, 2012

(86) PCT No.: PCT/EP2012/076495
§ 371 (c)(1),
(2) Date: Jun. 26, 2014

(87) PCT Pub. No.: WO2013/098213
PCT Pub. Date: Jul. 4, 2013

(65) Prior Publication Data
US 2014/0359157 A1 Dec. 4, 2014

(30) Foreign Application Priority Data
Dec. 29, 2011 (EP) .................................... 11306805

(51) Int. Cl.
*H04N 21/236* (2011.01)
*H04N 21/2343* (2011.01)
(Continued)

(52) U.S. Cl.
CPC ......... *H04N 21/236* (2013.01); *H04L 65/608* (2013.01); *H04N 21/2365* (2013.01);
(Continued)

(58) Field of Classification Search
None
See application file for complete search history.

(56) References Cited

U.S. PATENT DOCUMENTS

| 7,203,758 B2 * | 4/2007 | Cook | H04N 7/165 |
| | | | 348/E7.063 |
| 7,826,537 B2 | 11/2010 | Zhang et al. | |

(Continued)

FOREIGN PATENT DOCUMENTS

| CN | 101453641 A | 6/2009 |
| JP | 2009-10649 A | 1/2009 |

(Continued)

OTHER PUBLICATIONS

Renzi et al., "Video content adaptation based on SVC and associated RTP packet loss detection and signaling", 2008 Ninth International Workshop on Image Analysis for Multimedia Interactive Services (WIAMIS), Klagenfurt, Austria, May 7, 2008, pp. 97-100.

(Continued)

*Primary Examiner* — Thomas Dailey
(74) *Attorney, Agent, or Firm* — Myers Wolin LLC

(57) ABSTRACT

This invention relates to a system, server and client for multiplexed streaming of multimedia content comprising at least one server being capable of transmitting multimedia content in a streaming environment through one or more data paths to a client, wherein the multimedia content is de-multiplexed by the server into a plurality of sub-streams with each sub-stream comprising a unique mark such that the client is capable of multiplexing said sub-streaming into a continuous stream. Furthermore, the invention relates to a method for multiplexed streaming of multimedia content.

18 Claims, 2 Drawing Sheets

(51) Int. Cl.
*H04N 21/2365* (2011.01)
*H04N 21/8547* (2011.01)
*H04N 21/63* (2011.01)
*H04N 21/6437* (2011.01)
*H04L 29/06* (2006.01)

(52) U.S. Cl.
CPC ... *H04N 21/234327* (2013.01); *H04N 21/631* (2013.01); *H04N 21/6437* (2013.01); *H04N 21/8547* (2013.01)

(56) References Cited

U.S. PATENT DOCUMENTS

| | | | |
|---|---|---|---|
| 2004/0045030 A1* | 3/2004 | Reynolds | H04L 29/06 725/110 |
| 2007/0200923 A1 | 8/2007 | Eleftheriadis et al. | |
| 2009/0234965 A1* | 9/2009 | Viveganandhan | H04L 65/4084 709/231 |
| 2010/0046552 A1 | 2/2010 | Jung et al. | |
| 2010/0049865 A1 | 2/2010 | Hannuksela et al. | |
| 2010/0205514 A1 | 8/2010 | Henocq et al. | |
| 2011/0158607 A1 | 6/2011 | Tariolle et al. | |
| 2012/0030314 A1* | 2/2012 | Kim | H04L 65/4084 709/219 |
| 2012/0216038 A1* | 8/2012 | Chen | H04L 9/083 713/168 |
| 2013/0002950 A1* | 1/2013 | Thompson | H04N 21/2221 348/500 |

FOREIGN PATENT DOCUMENTS

| | | |
|---|---|---|
| JP | 2011-172212 A | 9/2011 |
| KR | 2010058404 | 6/2010 |
| WO | WO2008088132 | 7/2008 |
| WO | WO2009127961 | 10/2009 |
| WO | WO2009154704 | 12/2009 |

OTHER PUBLICATIONS

Wenger et al., "RTP payload format for H.264/SVC scalable video coding" Journal of Zhejiang University (Science) A, vol. 7, No. 5, 2006, pp. 657-667.

Cho et al., "Cross-layer design for wireless video streaming", IEEE Global Telecommunications Conference, Honolulu, Hawaii, USA, Nov. 30, 2009, pp. 1-5.

Wang et al., "RTP Payload Format for H.264 Videodraft-ietf-avt-rtp-rfc3984bis-12.txt" Audio/Video Transport Working Group Request for Comments 3984, Oct. 9, 2010, pp. 1-104.

Schulzrinne et al., "A transport protocol for real-time applications", Network working group request for comments 3550, Jul. 2003, pp. 1-92.

Schulzrinne et al., "Real Time Streaming Protoco (RTSP)l" Network Working Group Request for Comment 2326, Apr. 1998, pp. 1-81.

International Standard ISO/IEC 13818-1, Informative technology—Generic coding of moving pictures and associated audio information: Systems, Third Edition, Oct. 15, 2007, pp. 1-13.

Telecommunication Standardization ITU-T: H.264 ISO-IEC, "Series H: Audiovisual and multimedia systemsInfrastructure of audiovisual services—Coding of moving videoAdvanced video coding for genetic audiovisual services", Mar. 2009, pp. 1-670.

Shier et al:"Scalable video coding over RTP and MPEG-2 transport stream in broadcast and IPTV channels" IEEE Wireless Communications, vol. 16, n°51 Oct. 2009 (Oct. 1, 2009), pp. 64-71.

Wang Ye-Kui et al:"System and Transport Interface of SVC" IEEE Transactions Oncircuits and Systems for Video Technoloy, IEEE Service CENTERvol. 17, n°901 Sep. 2007 (Sep. 1, 2007)pp. 114-1163.

Search Report dated Apr. 4, 2013.

* cited by examiner

SYSTEM AND METHOD FOR MULTIPLEXED STREAMING OF MULTIMEDIA CONTENT

This application claims the benefit, under 35 U.S.C. § 365 of International Application PCT/EP2012/076495, filed Dec. 20, 2012, which was published in accordance with PCT Article 21(2) on Jul. 4, 2013 in English and which claims the benefit of European patent application No. 11306805.0, filed Dec. 29, 2011.

INTRODUCTION

This invention relates to a system for multiplexed streaming of multimedia content. More particularly, this invention relates to a system for multiplexed streaming of multimedia content in which a multimedia stream is split into several sub-streams for later recombination at a client receiver. Furthermore, the invention relates to a method for multiplexed streaming of multimedia content.

BACKGROUND TO THE INVENTION

Streaming is the process where the content consumed by a client is sent in small pieces to the client as opposed to downloading, where the whole multimedia file is transferred to the client before playing. Existing streaming protocols include a Real-Time Transport Protocol (RTP) or a MPEG transport stream under user datagram protocol (MPEG TS/UDP). On the other hand, download is generally performed using a hypertext transfer protocol (HTTP protocol).

In entertainment and communications systems, RTSP Protocol (Real-Time Transport Streaming) is provided as a network control protocol for controlling streaming media servers. Transmission of streaming data by the RTSP servers is done via the Real-time Transport Protocol (RTP). RTSP defines control sequences useful in controlling playback of streaming data. The control sequences are defined in the RFC 2326 standard by the Internet Engineering Task Force (IETF).

The streaming session is initiated by the client towards the streaming server. Real-time streaming has become increasingly popular for transmitting TV-channels via the internet (IPTV). However, means have to be provided to cope with changing bandwidth rates between the multimedia provider and the client. Otherwise, "freezing" of multimedia streams would occur, which is generally considered as a nuisance by the customer.

Various attempts have been made in order to provide a reliable streaming session for the client so as to avoid freezing of the multimedia content due to changing bandwidth rates.

In US 2010/0049865 A1 a method of packetizing a media stream into transport packets is shown which includes determining whether application data units are to be conveyed in a first transmission session and a second transmission session. Upon a determination that the application data units are to be conveyed in the first transmission session and the second transmission session, packetizing at least a part of a first media sample in a first packet and at least a part of a second media sample in a second packet, the first media sample and the second media sample having a determined decoding order. Finally, signalling first information to identify the second media sample, the first information being associated with the first media sample is achieved.

In communication theory, it is foreseen that using several networks or links either concurrently or serially provides advantages regarding not only the quality of service but the scalability. One technology that can take benefits from the multilink environment is for instance scalable video coding.

SVC (Scalable Video Coding) is a H264 based standard that provides a layered coding structure in which the base layer is fully H264 AVC compatible and enhancement layers depend from the base layer or other enhancement layers. Scalability domains are time, quality and spatial. Therefore enhancement layers can be coded to enhance the frame rate, the quality for a given resolution, and the resolution of a video sequence.

If one compares, regarding a particular quality, frame rate and resolution, a H264 AVC sequence with an equivalent encoded with SVC using two or more layers, it has been shown that the overhead introduced by SVC requires around 10 and 15% more bandwidth.

The SVC stream that is multicast/broadcast is composed with different layers for example three layers, which are the base layer and two enhancement layers, for addressing e.g. three different terminal resolutions. If one compares the SVC stream with the same service using conventional H264 AVC coding, this would conduct to simulcast, i.e. three different streams for each resolution, and an overhead for the H264 solution that is greater than 100%.

In hybrid or combined networking the idea is about sending some layers, e.g. the base layer, through a broadcast pipe and the other layers, e.g. enhancement layer(s), through point to point.

This conduct to a streaming session that is split over two networks/links and recombined in the receiver.

When splitting a stream into two sub streams for later recombination, there is a need to save in some way the original order of the stream packets. When splitting e.g. a RTP stream into two sub-streams, each sub-stream, transmitted over a particular link/network, must be compliant with RTP and thus the sequence number should be usable at the receiver side to detect reordered or missing packets. Therefore, for each link and sub-stream, the RTP packets are renumbered and the original sequence number is lost.

For recombining the original stream one may rely on RTP timestamp. However the original stream could have several RTP packets having the same timestamp but having a sequence of presentation to the decoder to be respected.

Accordingly, there is a need in the art to provide a method and a system for multiplexed streaming of multimedia content that respectively overcome—at least partially—the problems associated with the prior art systems.

SUMMARY OF THE INVENTION

According to the invention, there is provided a system for multiplexed streaming of multimedia content comprising at least one server being capable of transmitting multimedia content in a streaming environment through one or more data paths to a client, wherein the multimedia content is de-multiplexed by the server into a plurality of sub-streams with each sub-stream comprising a unique mark such that the client is capable of multiplexing said sub-streams into a continuous stream.

According to an embodiment of the invention, the unique mark comprises a clock mark.

According to a further embodiment of the invention, the clock mark includes a bit sequence with a time resolution exceeding the resolution of a frame rate of said multimedia content.

According to a further embodiment of the invention, the different sub-streams are identified using those bits of the bit sequence which correspond to the above frame rate timing information.

According to a further embodiment of the invention, the clock mark comprises a 33 bits part in 90 kHz units and a 9 bits part in 27 MHz units.

According to a further embodiment of the invention, the streaming environment is a MPEG2-TS streaming environment.

According to a further embodiment of the invention, the unique mark includes an original sequence number in a header extension.

According to a further embodiment of the invention, the unique mark includes an original sequence number in a payload part of each sub-stream.

According to a further embodiment of the invention, the streaming environment is a RTP/RTSP streaming environment.

In a further aspect of the invention, there is provided a method for multiplexed streaming of multimedia content which comprises providing a plurality of sub-streams for transmitting multimedia content in a streaming environment from one or more servers through one or more data paths to a client, wherein each sub-stream comprises a unique mark such that the client is capable of multiplexing said sub-streams into a continuous stream.

The invention proposes in its embodiments two solutions to solve the problem. The first embodiment consists to save the original sequence number in a header extension or within the payload part of each RTP packet. However, the Maximum Transmission Unit (MTU) is impacted and there is a need on the receiver side, before re-combination, to restore the original sequence number. Furthermore, not all streaming formats use a sequence number. For MPEG2-TS, the sequence number is called Continuity Counter and is coded onto 4 bits that is a severe limitation for lost packet detection as it is possible to have several tens of consecutive TS packets having the same time stamp. This is why the TS stream is usually carried using RTP over non reliable networks such as the Internet.

The second embodiment proposes to rely only on timestamps for restoring the original packet ordering. During the split, for all RTP packets having the same timestamp, there is an increment by one of the successive time stamp value. This is possible as the time stamp resolution is far above what is necessary for video synchronization and display. For instance, the recommended clock rate for H264 RTP is 90 kHz. It means that between two video frames at 100 Hz, the timestamp value is incremented by 900. On the receiver side, before re-combination an inverse operation is performed. Detecting a packet with a new timestamp k, for each successive packet the timestamp value is incremented by 1.

Regarding MPEG2-TS this invention works as well whenever MPEG2-TS is carried over RTP wherein in that case RTP timestamp is commonly not used at all.

DETAILED DESCRIPTION OF THE INVENTION

The invention will now be described in greater detail by way of example with reference to the following drawing in which.

Figure 1:
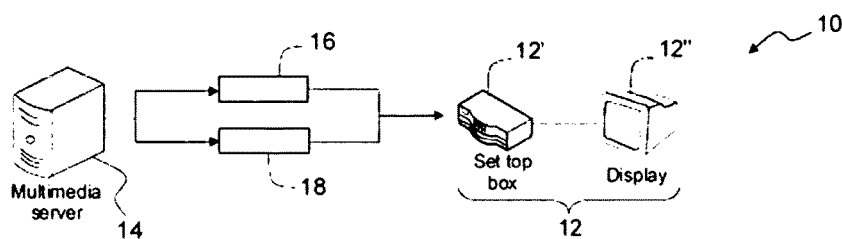
FIG. 1 shows a schematic view of a system for multiplexed streaming of multimedia content according to an embodiment of the invention.

In the drawing, alike reference numerals refer to alike parts, unless otherwise indicated.

Referring now to FIG. 1, a first embodiment of the invention is shown. A system 10 for multiplexed streaming of multimedia content comprises a client 12 and a server 14 being capable of transmitting multimedia content in a streaming environment to the client 12. The client 12 is depicted as a set-top box 12' together with a display 12" in FIG. 1. The multimedia content to be displayed at client 12 is de-multiplexed by the server 14 into two sub-streams 16 and 18, as schematically indicated in FIG. 1.

Figure 2:
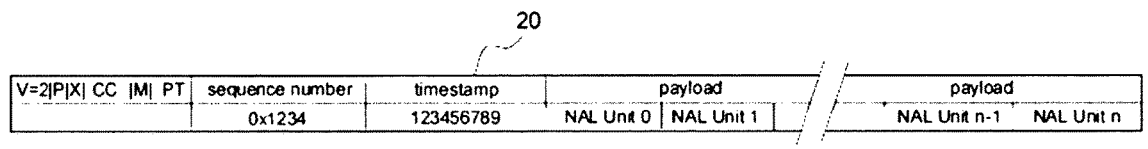
FIG. 2 shows a further detail of a streaming packet according to an embodiment of the invention.

As an example, a RTP streaming environment is described in FIG. 2 which is part of an original RTP stream. In FIG. 2, a packet 20 is shown which contains several network abstraction layer units (NALU) which will be placed in two different generated streams. For the convenience, it will be considered that the stream is transporting video signal which is coded in SVC with a base layer and an enhancement layer.

Accordingly, the implementation shown in FIG. 2 understands the RTP payload format for SVC as described in RFC3984bis. It is to be appreciated however that the invention is applicable to other types of content and is not limited to the use of SVC.

In the following, this stream 20 is split in two generated streams transporting respectively the base layer and the enhancement layer. For instance, the first stream could be transported over a broadcast network while the other one is delivered through a broadband network. It is noted that the present invention is independent of the rules to select in which stream a data will be placed or on which network the secondary streams are delivered.

The two generated streams are achieved by extracting the NALU and putting them in new RTP packets. The newly built packets are realised with the RTP header (cf. RFC 3550) and header of the original stream where the sequence number 22 and the timestamp 24 are modified as shown in FIG. 3.

The generated streams are independent. It means that for each of them, the generation of the first RTP packet is the beginning of the sequence numbering 22. The sequence numbering 22 is incremented by 1 for each new built packet.

Figure 3:
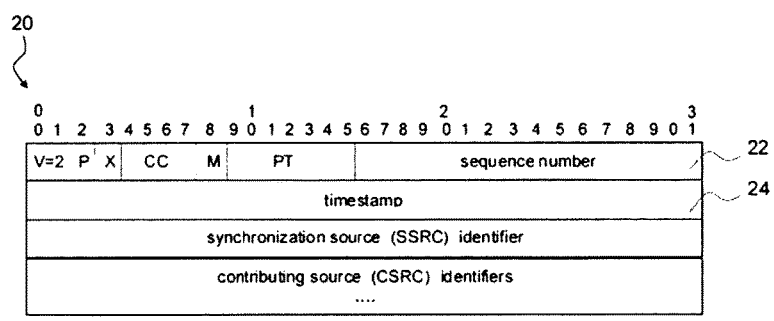
FIG. 3 shows a further detail of a streaming packet according to an embodiment of the invention.

In the example shown in FIG. 3, the original RTP timestamp value is 123456789. This timestamp 24 indicates the presentation time of the video or audio contained in the access units of the original RTP packet. While having a unique presentation time, the different NALU shall be provided to the decoder or more generally to the renderer in the same order as they have been generated and, consequently, placed in the original RTP packet. In order to manage the reordering in the receiver the timestamp 24 of the generated streams' packets 26 and 28 are modified.

Figure 4:
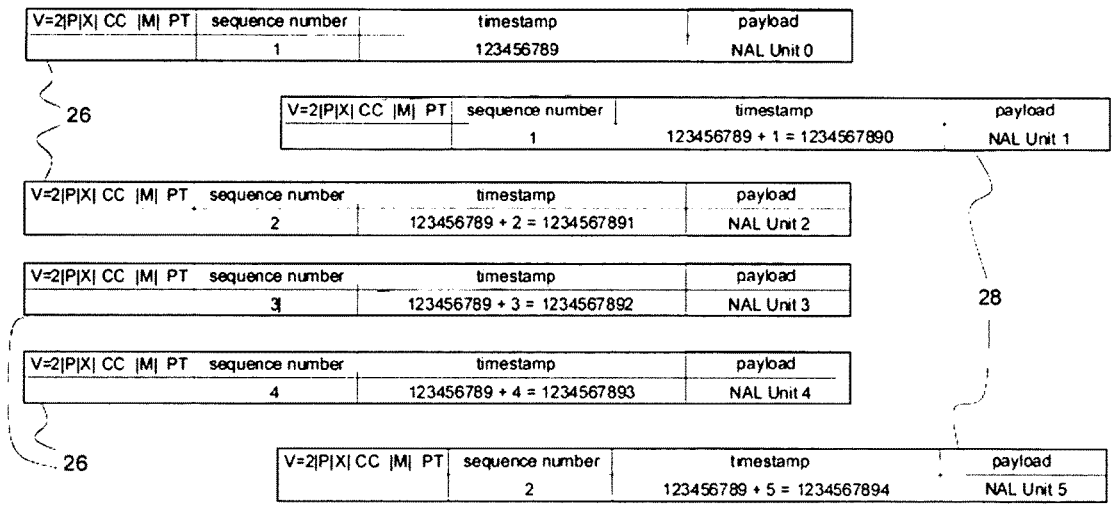
FIG. 4 shows a further detail of a streaming packet according to an embodiment of the invention.

Making now reference to FIG. 4, the first NALU, part of the base layer, of the original packet is sent first in secondary stream 26. If one considers that it is the first packet of the stream, it will be generated with a sequence number 22 set to 1.

The second NALU is part of the enhancement layer and is sent in the generated stream 28. Since it is also the first packet of this stream, its sequence number 22 is 1.

The three following NALU are part of the base layer. They will be transported in three RTP packets of the generated stream 26 with sequence number 22 set respectively to 2, 3 and 4.

The last NALU is part of the enhancement layer and belongs to generated stream 28.

The same splitting process is applied to all the original stream packets.

Whatever secondary stream where a RTP packet is sent, the timestamp 24 is built as follows: the RTP packet containing the first NALU has the timestamp 24 of the original RTP packet and the RTP packet containing the $i^{th}$ NALU has the timestamp 24 of the original RTP packet+(i−1).

For the reception of a complete stream, the receiver or client 12 manages the RTP sessions. The both streams 26 and 28 are recombined before presentation to a decoder by applying the algorithm symmetric to the one described above (cf. FIG. 5).

Figure 5:
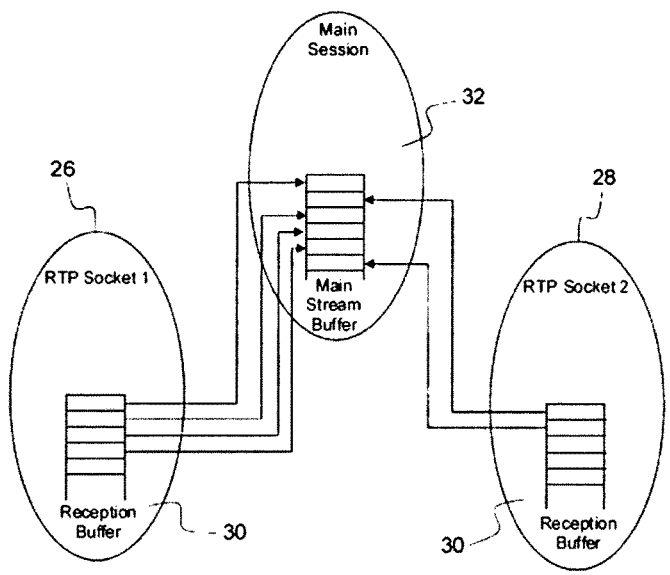
FIG. 5 shows a further schematic view of a system for multiplexed streaming of multimedia content according to an embodiment of the invention.

As shown in FIG. 5, the reordering process takes the packets of each RTP reception buffer 30 to move them in a main stream buffer 32. Those RTP packets are placed in the main stream buffer 32 according to an increasing order of their timestamp 24 value. The timestamps 24 of those packets are set to the value of the timestamp 24 of the first received packet (123456789 in the example) of the group.

The payloads of a set of packets with contiguous values of timestamp 24 can also be merged in a single RTP packet. This newly built packet has the timestamp 24 of the first packet of the contiguous group. In the current example this value would be 123456789.

A set of adjacent received RTP packets may be too long to be merged in a single RTP packet. In this manner several RTP packets with the same timestamp are built.

When two adjacent received RTP packets have not contiguous timestamps, it means that their payloads did not belong to same original RTP packet. In this case a new RTP packet, with the timestamp of the second packet, shall be built in the main stream buffer. This new RTP packet will integrate the payloads of the subsequent received RTP packets having a contiguous timestamp.

When initiating the stream reception, the value of the sequence number for the first of all the RTP packets of a stream can be chosen arbitrarily.

Alternatively, recalling the SVC usage example above, a receiver or client 12 may decide to decode only one of the two RTP sessions, typically the session carrying the base layer. When receiving only a single RTP session, the sequence numbers 22 of the RTP packets are continuous and allow the detection of missing or reordered packets. However the timestamps 24 of the received RTP packets will expose gaps as some of the timestamps 24 are used by packets sent on the other session. The above algorithm for recovering the original timestamps 24 needs to be adjusted as follows.

The first received packet's timestamp 24 (noted packet i) is used as a series' timestamp 24, noted $RTP_0$ and its timestamp 24 is left unchanged.

If the following packet k has timestamp $RTP_k < RTP_0 + (k-i) +$ threshold, the packet belongs to the series and its timestamp is set to $RTP_0$. If the inequality is false, then the packet starts another series.

In MPEG2-TS, there is clock information called PCR (Program Clock Reference) that permits to synchronise the clocks of the sender or server 14 and receiver or client 12. It is composed with a 33 bits part (90 kHz units) and a 9 bits part (27 MHz units). When transporting multimedia information (such as audio and video), the packets carries further information which is called PTS for Presentation Time Stamp and DTS for Decoding Time Stamp. The precision of the PTS or DTS is of 33 bits and references the PCR clock. A unit is therefore equivalent to 11 microseconds.

Assuming the video frame rate can be up to 100 frames per second, a resolution of tens of milliseconds is required. The PTS/DTS resolution exceeds largely this resolution that gives the opportunity to apply the mechanism described above with a MPEG2 TS stream as well.

Accordingly, when splitting a MPEG2-TS stream into two sub-streams, the value of the PTS can be incremented by 1 for each PES (Packet Elementary stream) packet, resulting in a continuous series of incrementing PTS. Upon reception, the PES packets having a PTS immediately following the preceding PTS are set to the value of the first PTS of the series. The requirement being that a PTS or DTS must be present in the PES packet header of the original stream.

Accordingly, the invention allows a split of stream between different networks without losing the presentation timestamp or sequence numbering. Furthermore, it maintains a packet format compliant with existing protocols Although certain embodiments only of the invention have been described herein, it will be understood by any person skilled in the art that other modifications, variations, and possibilities of the invention are possible. Such modifications, variations and possibilities are therefore to be considered as falling within the spirit and scope of the invention and hence forming part of the invention as herein described and/or exemplified.

This invention having been described in its preferred embodiment, it is clear that it is susceptible to numerous modifications and embodiments within the ability of those skilled in the art and without the exercise of the inventive faculty. Accordingly, the scope of the invention is defined by the scope of the following claims.

All examples and conditional language recited herein are intended for pedagogical purposes to aid the read in understanding the principles of the invention and the concepts contributed by the inventor to furthering the art and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the system diagrams presented herein represent conceptual views of illustrative components embodying the present principles. The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and non volatile storage. Other hardware, conventional and/or custom, may also be included.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be understood that the present principles may be implemented in various forms of hardware, software, firmware, special purpose processors, or a combination thereof. Preferably, the present principles may be implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) that is executed via the operating system. In addition, various other peripheral devices may be connected to the computer platform such as an additional data storage device and a printing device.

It is to be further understood that, because some of the constituent system components and method steps of the present invention are preferably implemented in software, the actual connections between the system components (or the process steps) may differ from what is shown in the drawings depending upon the manner in which the present principles is programmed. Given the teachings herein, one of ordinary skill in the related art will be able to contemplate these and similar implementations or configurations of the present principles.

The invention claimed is:

1. A system comprising:
    a server being configured for demultiplexing an original packet of a multimedia content, said original packet containing two or more Network Abstraction Layer Units, into a plurality of sub-streams, wherein the server is configured for arranging a packet included within each sub-stream to include at least one payload datum of said original packet and a clock mark, said clock mark comprising a bit sequence adapted for identifying said packet included within its associated sub-stream, said clock mark being different from a clock mark for a different packet included within any sub-stream of said plurality of sub-streams, wherein the bit sequence for said packet, relative to a bit sequence for a different packet in any of said sub-streams, is indicative of an order of the payload datum for the packet relative to the payload datum for the different packet within the original packet, a value for the bit sequence of a packet of a sub-stream containing one of said Network Abstraction Layer Units being obtained by incrementing a time stamp value of the original packet by its ordering number minus 1, inside said original packet, of the Network Abstraction Layer Unit contained in said packet of said sub-stream; and
    a client device configured for multiplexing the payload datum from said plurality of sub-streams into a continuous stream, said multiplexing comprising ordering the payload datum of said packets of said sub-streams into at least one packet of said continuous stream, wherein the ordering is performed in accordance with the bit sequence for each said packet received in said plurality of sub-streams.

2. A system according to claim 1, wherein said bit sequence is defined with a time resolution exceeding the resolution of a frame rate of said multimedia content.

3. The system of claim 1 wherein each sub-stream are adapted to be transmitted through one or more data paths, in a streaming environment using a real-time streaming protocol.

4. The system according to claim 1, wherein the clock mark includes an original sequence number in a header extension.

5. The system according to claim 4, wherein the clock mark includes an original sequence number in a payload part of each sub-stream.

6. The system according to claim 3, wherein the streaming environment is a RTP/RTSP streaming environment.

7. A method performed in at least one server and comprising:
    demultiplexing an original packet of a multimedia content, said original packet containing two or more Network Abstraction Layer Units, into a plurality of sub-streams, and
    arranging a packet included within each sub-stream to include at least a payload datum of said original packet and a clock mark, said clock mark comprising a bit sequence adapted for identifying said packet included within its associated sub-stream, said clock mark being different from a clock mark for a different packet included within any sub-stream of said plurality of sub-streams, wherein the bit sequence for said packet, relative to a bit sequence for a different packet in any of said sub-streams, is indicative of an order of the payload datum for the packet relative to the payload datum for the different packet within the original packet, wherein a value for the bit sequence of a packet of a sub-stream containing one of said Network Abstraction Layer Units is obtained by incrementing a time stamp value of the original packet by its ordering number minus 1, inside said original packet, of the Network Abstraction Layer Unit contained in said packet of said sub-stream.

8. The method according to claim 7, wherein the bit sequence is defined with a time resolution exceeding the resolution of a frame rate of said multimedia content.

9. The method according to claim 7, wherein the clock mark of each packet of each sub-stream includes a sequence number of said original packet in a header extension or in a payload part of said packet of each said sub-stream.

10. A streaming server comprising:
    a memory that stores a plurality of instructions; and
    a processor coupled to the memory and configured to execute the instructions to:
        demultiplex an original packet of a multimedia content, said original packet containing two or more Network Abstraction Layer Units, into a plurality of sub-streams;
        arranging a packet included within each sub-stream to include at least a payload datum of said original packet and a clock mark, said clock mark comprising a bit sequence adapted for identifying said packet included within its associated sub-stream, said clock mark being different from a clock mark for a packet included within any other sub-stream of said plurality of sub-streams, wherein the bit sequence for said packet, relative to a bit sequence for a different packet in any of said sub-streams, is indicative of an order of the payload datum for the packet relative to the payload datum for the different packet within the original packet, wherein a value for the bit sequence of a packet of a sub-stream containing one of said Network Abstraction Layer Units is obtained by incrementing a time stamp value of the original packet by its ordering number minus 1, inside said original packet, of the Network Abstraction Layer Unit contained in said packet of said sub-stream.

11. A streaming client device comprising a memory that stores a plurality of instructions and a processor coupled to the memory and configured to execute the instructions for:
multiplexing in a continuous stream, a plurality of sub-streams of multimedia content,
a packet of each sub-stream comprising a clock mark, said clock mark comprising a bit sequence adapted for identifying said packet within its associated sub-stream, said clock mark being different from a clock mark of any other packet included within any other sub-stream of said plurality of sub-streams, wherein the bit sequence for said packet, relative to a bit sequence for a different packet in any of said sub-streams, is indicative of an order of the payload datum for the packet relative to the payload datum for the different packet within an original packet of the multimedia content, said packet containing two or more Network Abstraction Layer Units, wherein a value for the bit sequence of a packet of a sub-stream containing one of said Network Abstraction Layer Units is obtained by incrementing a time stamp value of the original packet by its ordering number minus 1, inside said original packet, of the Network Abstraction Layer Unit contained in said packet of said sub-stream;
said multiplexing comprising ordering contents of said packets of said sub-streams in at least one packet of said continuous stream according to their bit sequences.

12. A streaming client device according to claim 11, wherein said bit sequence is defined with a time resolution exceeding the resolution of a frame rate of said multimedia content.

13. The method according to claim 7 wherein a value for said bit sequence values is based, at least in part, on the timestamp of the original packet in said multimedia content.

14. A streaming server according to claim 10, wherein said bit sequences are defined with a time resolution exceeding the resolution of a frame rate of said multimedia content.

15. A method, to be performed in at least one client device, comprising:
multiplexing, in a continuous stream, a plurality of sub-streams of multimedia content,
a packet of each sub-stream comprising a clock mark, said clock mark comprising a bit sequence adapted for identifying said packet within its associated sub-stream, said clock mark being different from a clock mark of any other packet included within any other sub-stream of said plurality of sub-streams, wherein the bit sequence for said packet, relative to a bit sequence for a different packet in any of said sub-streams, is indicative of an order of the payload datum for the packet relative to the payload datum for the different packet within an original packet of the multimedia content, said packet containing two or more Network Abstraction Layer Units, wherein a value for the bit sequence of a packet of a sub-stream containing one of said Network Abstraction Layer Units is obtained by incrementing a time stamp value of the original packet by its ordering number minus 1, inside said original packet, of the Network Abstraction Layer Unit contained in said packet of said sub-stream;
said multiplexing comprising ordering contents of said packets of said sub-streams in at least one packet of said continuous stream according to their bit sequences.

16. The method according to claim 15 wherein said multiplexing comprises placing said packets of said sub-streams in a buffer according to an increasing order of their bit sequences.

17. The method according to claim 16 wherein adjacent packets placed in said buffer having not contiguous bit-sequences are used to build different packets of said continuous stream.

18. The system according to claim 3, wherein the streaming environment is a MPEG2-TS streaming environment.

* * * * *